July 19, 1932.　　T. A. HAMMOND　　1,868,165

TIRE VALVE

Filed Nov. 2, 1927

Inventor
Theodore A. Hammond
By Attorney
M. P. Laughlin

Patented July 19, 1932

1,868,165

UNITED STATES PATENT OFFICE

THEODORE A. HAMMOND, OF MONTCLAIR, NEW JERSEY

TIRE VALVE

Application filed November 2, 1927. Serial No. 230,420.

This invention relates to tire valves.

It is the object of this invention to provide certain improvements in the construction of tire valves, in the seal which they effect, and in the replacement of the parts thereof as they become worn.

It is the primary object of this invention to provide a replaceable valve disc for tire valves in such form that it may be inserted in the tire valve body while the same is in place and without dismounting the parts, or replacing the entire valve assembly as was heretofore necessary when repairs were to be effected.

It is also the object of this invention to provide a new and novel form of valve disc for the purposes described, and to provide novel means for mounting and operating the same when in place.

A further object of the herein disclosed invention lies in the provision of means whereby the valve seal is supplemented by a secondary sealing means complementary thereto and aiding a perfect air-tight closure.

I am aware that replaceable tire valves, or more correctly speaking, tire valves having their disc, stem, seat, and spring arranged as a replaceable unit, are well known to the art, but it is the purpose of my invention to simplify and reduce the cost of the replaceable part, while at the same time increasing the effectiveness of the whole for the purposes for which it is installed.

The following description, the appended drawing to which it refers, and the claims will more clearly show my invention and make plain certain other improvements thereby accomplished.

Figure 1:
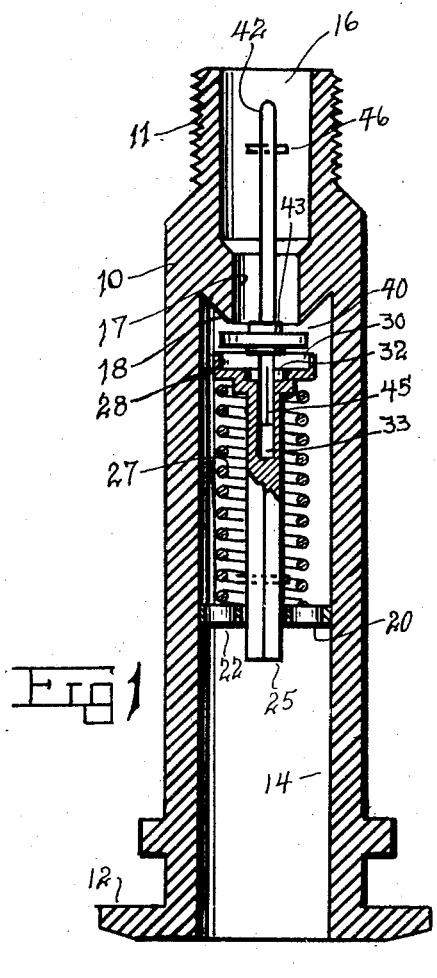
Figure 1 is a cross sectional elevation of a tire valve body; the valve disc and its pin being shown complete, while a portion only of the valve stem and cup is broken away.
Figure 2:
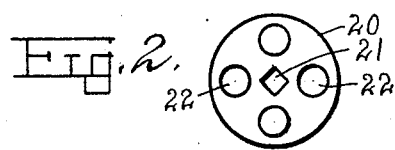
Figure 2 is a plan view of the valve stem guide disc.

Referring now to the drawing in detail, the valve body 10 is provided with the usual cap thread 11, the tube engaging flange 12 and certain other features of embodiment upon its exterior after the fashion well known to the art. The interior of valve body 10 is provided with a main bore 14, an inlet bore 16 and an intermediate reduced diameter bore 17, at whose inner end is formed a conical valve seat 18. Arranged within bore 14 is a valve stem guide disc 20 having a valve stem opening 21 and a plurality of air ports 22 surrounding the same. Sliding in this valve stem guide disc is the valve stem 25 surrounded by spring 27 bearing against the valve stem guide disc at its lower end and against the underside of the cup 28 at the upper end of the valve stem. Cup 28, the rim of which is indicated at 30, it will be noted, is provided with a central recess 32, which terminates in a bore 33 extending a substantial distance within the valve stem 25.

The valve disc 40 is preferably of soft readily deformable rubber and is retained upon disc pin 42 through suitable means such as the collars 43 forced over the pin on either side thereof. Pin 42 is preferably slotted as at 45 near its lower end, while adjacent its upper end it has a cross bar 46 inserted therethrough.

Consideration of the structure just described will show that cup 28 and its pendent stem 25 is normally pressed upward by spring 27 and that a disc seated within the cup will normally be held against seat 18;—It being understood that the air pressure within the tire acting through bore 14 aids the action of the above mentioned spring and that when tire inflation means are connected to thread 11 that the application of pressure through bore 16 and 17 will unseat the valve disc to permit air entrance.

The valve disc is inserted through bores 16 and 17 by simply grasping the pin 42 and forcing the same downward through the constricted bore 17, the valve disc of compressible or elastic material being deformed to permit its passage and immediately reforming upon entering bore 14 as shown in Fig. 1 (which indicates the disc 40 just about to be forced to its seat in recess 30) recess 32 providing space for the lower collar, while the split end of pin 42 engaging bore 33 serves to retain the whole in place. The small upper end of pin 42 and cross bar 46 provide means whereby the usual valve cap may be employed as a tool to engage the pin and force the disc into place.

Manifestly the body of the tire valve and its outward form are subject to many modifications and have not been shown in detail herein to avoid surplusage in description. It will be equally clear that many changes in the embodiment of my invention may be made while within the scope thereof and within the spirit of the appended claims.

What I claim is:

1. A tire valve comprising a unit casing, having a longitudinal bore, a portion of which, intermediate the ends of the casing, is of a reduced diameter for providing a valve seat at the upper end of the part of the bore therebelow, an apertured guide disc frictionally held within the bore below said seat, a valve stem reciprocable within said guide disc, a cup of non-yieldable material having an internal diameter greater than that of the aforesaid reduced portion of the bore, fixed to the upper end of said stem, a spring in bearing engagement with said apertured disc and said cup to urge said cup toward said valve seat, a disc of resilient material having a diameter corresponding to that of the interior of said cup, a pin extending through said latter disc and fixed thereto, whereby said resilient disc may be pressed through the reduced portion of said bore, substantially the entire area of said disc being deformable under contact with the wall of the reduced portion of the bore to facilitate its passage therethrough, said resilient disc being locatable within said cup to cooperate with said valve seat to seal said bore under the influence of said spring, said cup and said resilient disc providing a non-deformable valve having a yieldable surface presented for engagement with said valve seat.

2. A tire valve, comprising a unit casing having a longitudinal bore, a portion of said bore, adjacent its upper end, being of a reduced diameter and formed with a downwardly projecting valve seat, a valve mechanism, embodying a cup of a greater diameter than the reduced portion of said bore, locatable within said bore only from the lower end thereof, said cup when said mechanism is positioned within said bore being in juxtaposition to said valve-seat, a disc of resilient material having a pin extending centrally therethrough, and of a diameter corresponding to the internal diameter of said cup, adapted to be inserted from the upper end of said bore and pressed through the reduced portion thereof in deformable contact with its defining wall, for seating within said cup, in engagement with the base and inner surface of the rim thereof, said disc forming the seat-engaging surface of the valve.

3. A valve for tires and other air containers having a casing provided with a longitudinal bore, a portion thereof, adjacent one end, being of a reduced diameter and providing a dependent valve seat and a valve mechanism positioned within said bore below said seat, said mechanism including a non-flexible element of a diameter greater than that of the reduced portion of said bore, a stem depending from said element, means associated with the inner surface of the larger portion of said bore forming a guide for said stem and a spring, interposed between said element and said means, adapted to urge said element towards said seat, all of said described valve mechanism being locatable within said bore only from the lower end thereof, a body of resilient material having a diameter greater than that of the reduced portion of said bore, said body being insertable through the minor diameter bore portion by deformation in contact with the wall thereof, for disposition upon said element in its normally expanded condition to cooperate with said seat to seal said bore under the influence of said spring and means projecting upwardly through the reduced portion of said bore and actuatable for depressing said element in opposition to said spring.

In testimony whereof I have affixed my signature to this specification.

THEODORE A. HAMMOND.